Nov. 16, 1937.  F. H. NASS ET AL  2,099,216
METAL TESTING MACHINE
Filed May 4, 1934
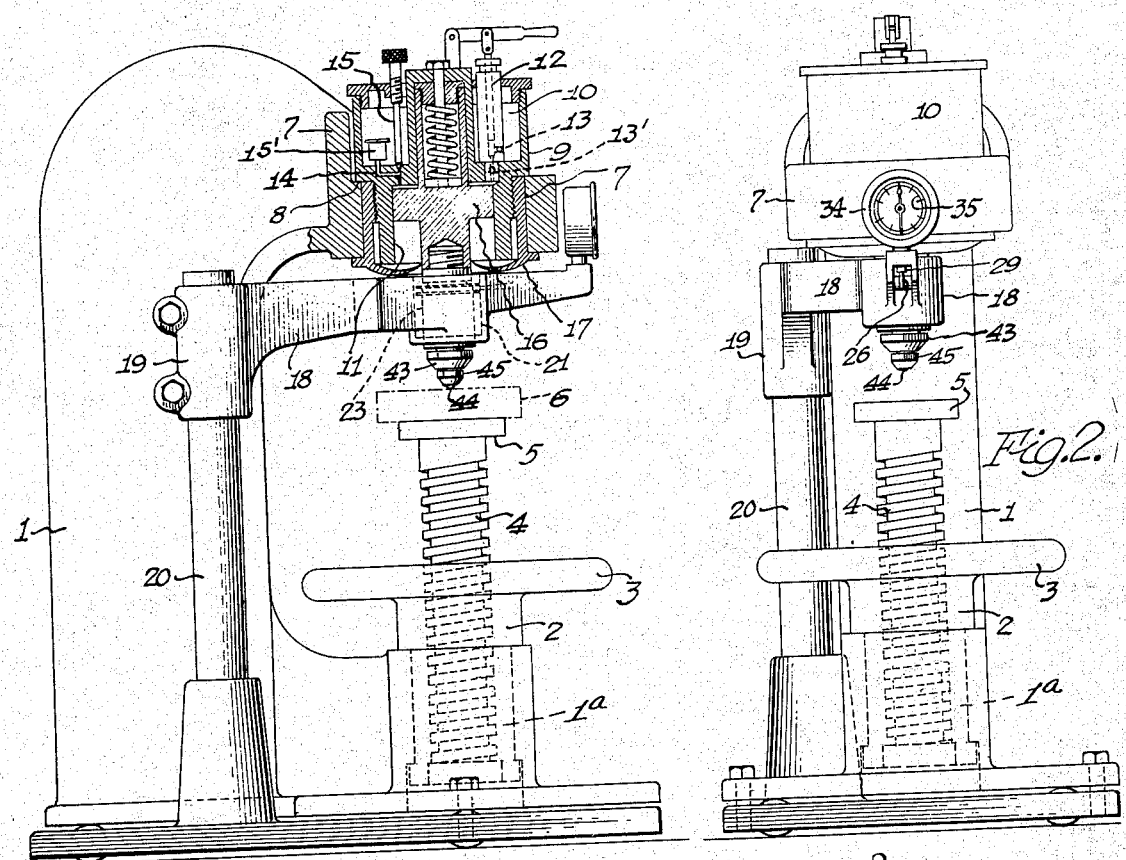
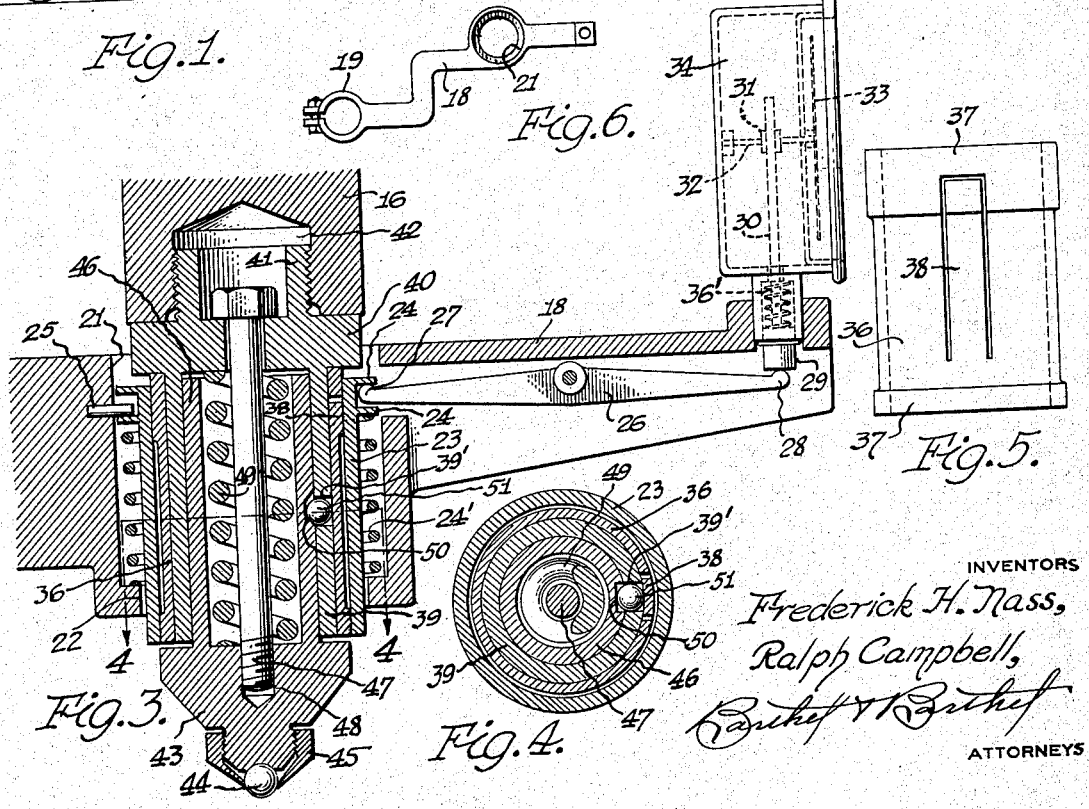
INVENTORS
Frederick H. Nass,
Ralph Campbell,
ATTORNEYS Patented Nov. 16, 1937

2,099,216

UNITED STATES PATENT OFFICE 2,099,216

METAL TESTING MACHINE

Frederick H. Nass and Ralph Campbell, Detroit, Mich.

Application May 4, 1934, Serial No. 723,954

6 Claims. (Cl. 265—12)

The present invention pertains to a novel device for testing the hardness of metal and relates more particularly to that class of testing machine wherein a test ball is caused to penetrate the structure of a sample by building up high pressure thereon and the hardness of the metal is determined by the amount of movement of the ball for a given pressure.

The primary object of the present invention is to provide means for measuring the amount of movement of a test ball when a given pressure is applied thereon. It functions as a comparative measuring device inasmuch as a sample of known hardness is first tested with a given pressure and the amount of movement is recorded or marked on an indicator. Samples of metal of unknown hardness are then tested by subjecting them to the same amount of pressure and the indicator compares the amount of movement of the test ball relative to the unknown sample with the amount of movement relative to the known sample and it is thus determined whether or not the hardness of the unknown sample is within the manufacturer's tolerance range.

Another object of the present invention is to provide a measuring attachment for metal testing machines of the type wherein means are provided for building up pressure on a test ball to cause it to penetrate into the inner structure of a sample of metal, such measuring attachment being constructed and arranged so that the accuracy of its function is not impaired by strains in the pressure means or its support resulting from the high pressure necessary to cause the movement of the ball. To this end the measuring attachment is constructed and mounted entirely separate from the pressure means and the frame which supports the pressure means so that when the pressure means or frame become strained or slightly distorted or flexed as a result of the extremely high pressure on the test ball the accuracy of the reading provided by the present measuring device is in no way influenced thereby.

With the above and other ends in view the invention consists in matters hereinafter set forth and more particularly pointed out in the appended claims, reference being had to the accompanying drawing, in which Figure 1 is a side elevation of the present device applied to a testing machine, part of the latter being shown in cross section;

Fig. 2 is a front elevation;

Fig. 3 is a fragmentary central vertical cross section;

Fig. 4 is a cross section taken on the line 4—4 of Fig. 3;

Fig. 5 is an elevation of a detail, and

Fig. 6 is a plan of a detail.

Like characters of reference are employed throughout to designate corresponding parts.

With reference to Figs. 1 and 2 the numeral 1 designates a G shaped frame supporting a sleeve 1a. Received in the sleeve 1a, which is internally screwthreaded, is a screwthreaded post 4. The opposite ends of the post 4 extend outwardly from opposite ends of the sleeve 1a which serves to support the same with its axis in a vertical plane and so that by manually rotating the post it may be adjusted vertically. The upper end of the post 4 carries a table 5 suitable for receiving a sample of metal such as is indicated at 6 in broken lines. Received on the post 4 is a jamb nut 2 having a flange 3 by means of which it may be manually rotated. This construction obviously constitutes a vertically adjustable work support of a type which is well known in the art and which forms no part of the invention to be described.

The upper part of the frame 1 is formed with a cylindrical bore 7 having a shoulder 8. A body 9 rests upon the shoulder 8 and is thus disposed partly in the bore 7 and partly out. In the body 9 is formed a liquid reservoir 10, disposed near the upper end, and in the bottom end is formed a cylindrical chamber 11. A hand pump 12 has its intake port 13 disposed within the reservoir 10 and its outlet port 13' entering the cylindrical chamber 11. The inlet and outlet ports 13 and 13' respectively are provided, as indicated, with check valves in the manner well known in the art and therefore not shown in detail here.

A port 14 is formed in the body 9 to provide a means of direct communication between the chamber 11 and the reservoir 10 and is controlled by a manual valve 15. An adjustable pressure regulating valve 15' is also provided to control the port 14 for a purpose which will hereinafter appear. Slidably supported in the cylindrical chamber 11 is a plunger 16 which is retained within the chamber by a collar 17 screwthreaded onto the lower end of the body 9.

The above described device is conventional and is well known in this particular art and therefore lends no novelty to the present invention, it merely being shown by way of example to provide the desired setting for the invention to be described. The function of the above described device is to move the plunger 16 downwardly and this is accomplished by operating the pump 12 manually to force fluid under pressure from the reservoir 10 into the chamber 11 above the plunger. When the fluid pressure reaches a predetermined point the valve 15' functions to prevent its exceeding that point. It is obvious that this construction is merely shown by way of example and that the invention is applicable to any structure wherein a movable member is equipped with means for building up a predetermined pressure thereon.

The novel measuring device includes an arm 18 which is shown in detail in Fig. 6, one end of the arm being provided with frictional clamping means 19 for adjustably securing it on a vertical post 20. It will be observed that the post 20 is entirely separate from the frame member 1 although it may be supported on the same base. The arm 18 has a bore 21 formed with an inwardly directed flange 22, the bore 21 being located directly beneath the bore 7 due to the irregularity in the shape of the arm as more clearly shown in Fig. 6. Loosely received in the bore 21 is a sleeve 23 having spaced peripheral flanges 24 adjacent to the upper end thereof and forming a circumferential groove. A pin 25 is mounted in the arm 18 and its end projects into the groove formed by the flanges 24, it being noted that the flanges 24 are spaced apart a distance permitting a limited amount of longitudinal movement of the sleeve 23. A compressed coil spring 24' of comparatively light construction is sleeved around the sleeve 23 and has its opposite ends engaging the flange 22 and the lower flange 24 respectively. Pivotally mounted in the arm 18 is a lever 26 having its end 27 projecting into the groove formed by the flanges 24. The opposite end 28 engages a movable member 29 carrying a rack 30 meshing with a gear 31 on a shaft 32 carrying an indicator needle 33 in the indicator housing 34, the needle cooperating with an indicia bearing plate 35. A spring 36' normally urges the movable member 29 downwardly to maintain constant contact between the part 29 and the end 28 of the lever and this contact tends to rock the lever 26 so as to maintain the end 27 in contact with the upper of the flanges 24.

Slidably received in the sleeve 23 is a cylindrical body 36 shown in detail in Fig. 5. The cylindrical body 36 is provided with machined bearing portions 37 adjacent to both its upper and lower ends which fit snugly in the sleeve 23 and is furthermore pierced with a substantially U-shaped saw cut in a manner to form a flexible finger 38. A tubular member 39 is slidably received in the cylindrical body 36 and has an angular solid part 40 suitable for receiving a wrench so that the screwthreaded stem 41 formed integral thereon may be tightened in a screwthreaded bore 42 formed in the lower extremity of the plunger 16. The tubular member 39 is formed with a slot 39' disposed in line radially with the flexible finger 38.

A head 43 has a hardened ball 44 supported thereon by a retainer 45, the head having an upwardly extending hollow stem 46 slidably received in the tubular member 39. A bolt 47 has one end engaging the portion 40 and its other end received in a screwthreaded bore 48 in the head 43 and serves as an adjustable means for tying the head 43 to the tubular member 39. A comparatively heavy coiled spring 49 is interposed between the portion 40 of the tubular member 39 and the head 43.

Finally the stem 46 is formed with a cam shaped notch 50 and a ball 51 is received in the slot 39' and has a portion thereof extending into the notch 50.

Prior to operation the bolt 47 is adjusted so that a clearance is maintained, as a result of pressure of spring 49, between the head 43 and the lower end of tubular member 39, and also between the upper end of the hollow stem 46 and the solid portion 40 of the tubular member 39. The sample piece of metal 6 is then placed on the work table 5 and the latter is elevated through operation of the sleeve 2 and screw post 4 until the work 6 is brought into contact with the test ball 44 in the manner shown in Fig. 1. The device is then in readiness for testing the hardness of the sample 6.

The pump 12 is then operated to build up fluid pressure in the chamber 11 and the plunger 16 is caused to move downwardly. The tubular member 39 is carried downwardly with the plunger 16 and at the same time the stem 46 on the head 43 is held against movement by engagement of the ball 44 with the sample 6. Therefore a relative movement takes place between the stem 46 and the tubular member 39 and the clearance between the head 43 and tubular member 39 is thus taken up by compressing the coiled spring 49. Simultaneous with the taking up of the clearance the ball 51 is carried downwardly by the tubular member 39 and engages the cam notch 50 which thrusts it outwardly into engagement with the flexible finger 38. The ball 51 causes the finger 38 to be flexed outwardly so that it frictionally engages the sleeve 23 and in this manner the sleeve 23 is connected to the head 43 to move therewith. The spring 49 is of sufficient strength that when it is compressed it exerts sufficient thrust on the ball 44 to cause it to make good contact with the metal and therefore when the sleeve 23 becomes connected to the head 43 in the manner above described there is sufficient pressure being exerted by the spring 49 to take up all possible losses of motion so that when additional pressure is placed on the ball it will immediately begin to penetrate the structure of the sample. At this time the pump 12 is again operated and the parts move downwardly as the ball 44 is forced into the sample 6 and with the parts moves the sleeve 23. The flanges 24 cause the lever 26 to rock to move the rack 30 upwardly, rotate the gear 31, and move the indicator needle 33. The operation of the pump 12 is continued until the pressure valve 15' operates at which time the maximum pressure has been reached and the amount of movement of the ball as a result of this pressure is noted. After the test is thus made the valve 15 is manually opened to permit the fluid to discharge from the chamber 11 into the reservoir 10.

The above operation determines the amount of movement of the test ball 44 as a result of a given pressure and if the hardness of the sample is known other samples of unknown hardness may be compared therewith by similar testing operations and by comparing the movement reading with the reading relative to the sample of known hardness. It is obvious that by testing several samples of different known hardness that a depth table may be provided which will obviate the necessity of testing different samples when the device is in use.

It is obvious that the amount of pressure necessary to cause the test ball 44 to function is very high and that a terrific stress is placed on the G frame 1 as a result of the manner in which the two ends thereof tend to spread. Even if the frame 1 becomes strained it can not render the reading inaccurate because of the manner in which the measuring apparatus is entirely separate from the pressure means as far as stresses are concerned, it being observed that the measuring device is loosely interposed between the pressure medium and the work and that it begins to function at the time the test ball begins to enter the structure of the sample.

Although a specific embodiment of the present invention has been illustrated and described it will be understood that various changes may be made within the scope of the appended claims without departing from the spirit of the invention, and such changes are contemplated.

What we claim is:—

1. In a device of the character described, a plurality of relatively nesting parts, a test ball carried by one of said parts, an indicator connected to the other of said parts, frictional means for connecting said parts through relative movement therebetween, and pressure means for moving one of said parts.

2. In a machine for testing the hardness of metal, a test element holder having a tubular part, a means for applying pressure to said holder also having a tubular part, said tubular parts being connected together in telescoped relationship by means positively restricting relative telescoping movement thereof, a spring interposed between said holder and said pressure means and normally holding them extended, an indicator, an indicator actuating element, and clutch means actuated by relative movement of said telescoped parts for connecting one of said parts with said indicator actuating element when pressure is applied thereto sufficient to compress said spring.

3. In a machine for testing the hardness of metal, a supporting frame having an indicator thereon, an indicator actuating element movably supported in said frame, a test ball holder, a pressure apparatus, relatively telescoping parts interposed between said holder and said apparatus, yieldable means opposing telescopic movement of said parts, said yieldable means being adapted to be compressed when a predetermined back pressure is exerted against said ball holder, and a clutch device actuated by telescopic movement of said parts for connecting said indicator actuator with one of said parts.

4. In a machine for testing the hardness of metal, a supporting frame having an indicator thereon, an indicator actuating element movably supported in said frame, a test ball holder, a pressure apparatus, relatively telescoping parts interposed between said holder and said apparatus, yieldable means opposing telescopic movement of said parts, said yieldable means being adapted to be compressed when a predetermined back pressure is exerted against said ball holder, and a friction clutch actuated by movement of said parts for connecting one of said parts with said indicator actuator.

5. In a machine for testing the hardness of metal, a test ball holder having a tubular portion, means for applying pressure to said holder and also having a tubular portion, the first named tubular portion being received in the second named and having a cam surface coinciding with an opening in the second named tubular portion, a sleeve surrounding said second named tubular portion and having a flexible finger aligned with said opening, a ball in said opening, means connecting said holder and first named means whereby a predetermined relative movement is permitted therebetween, an indicator and an indicator actuating element adapted to be engaged by said flexible finger when relative movement between said tubular portions causes said cam to project said ball to flex said flexible finger.

6. In a machine for testing the hardness of metal, a test ball holder having a tubular portion, means for applying pressure to said holder and also having a tubular portion, the first named tubular portion being received in the second named and having a cam surface coinciding with an opening in the second named tubular portion, a sleeve surrounding said second named tubular portion and having a flexible finger aligned with said opening, a ball in said opening, means connecting said holder and first named means whereby a predetermined relative movement is permitted therebetween, means yieldably opposing relative movement between said tubular portions, an indicator, and an indicator actuating element adapted to be engaged by said flexible finger when relative movement between said tubular portions causes said cam to project said ball to flex said flexible finger.

FREDERICK H. NASS.
RALPH CAMPBELL.